US006640097B2

United States Patent
Corrigan et al.

(10) Patent No.: US 6,640,097 B2
(45) Date of Patent: Oct. 28, 2003

(54) WAP SERVICE PERSONALIZATION, MANAGEMENT AND BILLING OBJECT ORIENTED PLATFORM

(75) Inventors: Louis Corrigan, Enfield (IE); John Doyle, Bray (IE); Robert Harte, Dublin (IE); Brendan McGee, Mount Merrion (IE)

(73) Assignee: Markport Limited, Dublin (IE)

( * ) Notice: Subject to any disclaimer, the term of this patent is extended or adjusted under 35 U.S.C. 154(b) by 0 days.

(21) Appl. No.: 10/166,670

(22) Filed: Jun. 12, 2002

(65) Prior Publication Data

US 2002/0187775 A1 Dec. 12, 2002

Related U.S. Application Data (63) Continuation of application No. PCT/IE00/00146, filed on Dec. 13, 2000.

(30) Foreign Application Priority Data

Dec. 13, 1999 (IE) .................................. 991033

(51) Int. Cl.[7] ............................................ H04M 11/10
(52) U.S. Cl. ....................... 455/414; 709/223; 709/405; 709/406; 709/407; 709/408; 370/404
(58) Field of Search ................................ 455/414, 405, 455/406, 407, 408, 409; 709/223; 370/404

(56) References Cited

U.S. PATENT DOCUMENTS

| | | | | |
|---|---|---|---|---|
| 5,315,634 A | * | 5/1994 | Tanaka et al. | 379/57 |
| 6,269,101 B1 | * | 7/2001 | Gerszberg et al. | 370/404 |
| 6,459,892 B2 | * | 10/2002 | Burgan et al. | 455/412 |
| 6,463,382 B1 | * | 10/2002 | Bullock | 701/117 |

FOREIGN PATENT DOCUMENTS

| | | | | |
|---|---|---|---|---|
| WO | WO98/21874 | 5/1998 | | |
| WO | WO 98/21874 | * | 5/1998 | .......... H04M/17/00 |

OTHER PUBLICATIONS

Eckardt, Tim ; Magedanz, Thomas; zzzon personal Communications Impacts on Multimedia Teleservices Sep. 26, 1994 p.. 437–447; XP000613104.*
AU System Radio "WAP White Paper" Feb. 1999, XP002901226 Figures 3 and 4, pp. 5–9, 11, 12, 17, 18–21.*
Eckhardt et al, Multimedia ADV Teleservices . . . , pp. 435–447, Sep. 26, 1994, On the Personal Communications Impacts on . . . .
AU System Radio Wap White Paper, www.wapguide.com, pp. 1–19, Feb. 1999.

\* cited by examiner

*Primary Examiner*—Nay Maung
*Assistant Examiner*—Alan T. Gantt
(74) *Attorney, Agent, or Firm*—Jacobson Holman PLLC (57) ABSTRACT

An access node has a portal which performs interfacing between a wireless network domain and content/service providers in the Internet. On the wireless side the portal is linked with an SMSC, a CBC, and a USSD server for interfacing with and management of bearer stacks. Service functionality includes modular systems including a Push server, a Pre-paid calling server, and a location server in addition to internal portal functions. The latter provide for subscriber self-provisioning, customer care provisioning, subscriber device provisioning, and service provisioning. Thus, the node caters for both particular subscriber service and mobile device requirements.

18 Claims, 4 Drawing Sheets

FIG. 1

Intelligent Multimedia Gateway

WAP SERVICE PERSONALIZATION, MANAGEMENT AND BILLING OBJECT ORIENTED PLATFORM

This is a continuation of PCT/IE00/00146 filed Dec. 13, 2000 and published in English.

FIELD OF THE INVENTION

The invention relates to provision of mobile Internet services.

PRIOR ART DISCUSSION

The primary technology for mobile Internet applications is Wireless Application Protocol (WAP) technology. However, other technologies are also important, including voice, Short Message Service (SMS), GPRS, and 3GIP. It is known to provide a WAP gateway to provide access of mobile users to Internet content.

Delivering Internet based services to the wireless domain opens an extensive new market for network operators and content providers. However, when mobile, user needs and expectations differ greatly from when they may be in an office or home environment. Mobile users are unlikely to use their handsets to 'surf the web' at present as they might on a PC—at least until such time as available bandwidth is greatly increased and mobile networks have the necessary capacity to support such activities on a widescale basis.

Instead, mobile subscribers are more likely to have much more specific requirements when using the mobile device as a data terminal. They may, for example, wish to retrieve important emails from their mailbox, check the latest product pricing from the corporate intranet, receive the latest news updates or conduct a purchase, for example of cinema or concert tickets.

For such services to be viable on a mobile terminal, they must be accessible and intuitive and the subscriber should regard the services as being relevant and useful to him or her.

Various technical problems present themselves in an effort to achieve such user requirements. These include requirements to:

- Deliver an optimal service within the current limitations of wireless networks and devices, for example low bandwidth, latency, device processing power, display and memory size etc.
- Offer sophisticated mobile Internet services which will be as intuitive for subscribers to use as making a phone call.
- Provide a flexible billing scheme which is easily understood by users.
- Implement a secure, managed service environment whilst also offering personalised content.
- Support the large number of subscribers using non-WAP terminals.
- Manage a seamless service offering to both pre-paid and post-paid subscribers.
- Deliver services optimally over various bearers for example Circuit Switched Data, SMS, Cell Broadcast, GSM USSD and GPRS (or IS-95B/CDMA 2000 Packet data services).
- Provide a migration path to GPRS, EDGE and Third Generation network technologies.

The invention is directed towards providing a service management framework access node to provide at least some of these requirements.

SUMMARY OF THE INVENTION

According to the invention, there is provided a service management access node comprising a mobile network interface, an Internet interface, and a service conversion and message relaying platform between said interfaces for provision of Internet content to mobile subscribers, characterised in that, the platform comprises means for controlling mobile subscriber access according to security criteria, for allowing a mobile subscriber to create a personalised content profile, and for storing said profile and managing transmission of requests and delivery of content according to said profile, and the mobile network interface comprises a bearer stack for each of a plurality of different bearers.

In one embodiment, the platform comprises a portal comprising means for interfacing with the bearer stacks and with a WAP gateway, and wherein the portal comprises the Internet interface.

In another embodiment, the platform comprises a pre-pay system comprising means for allowing access by mobile subscribers to content on a pre-paid basis.

Preferably, the pre-pay system is a module linked with the portal.

In one embodiment, the portal is connected to the bearer stacks via bearer management functions.

In another embodiment, the bearer management functions include an SMSC.

In one embodiment, the bearer management functions include a cell broadcast control function.

In one embodiment, the bearer management functions include a USSD server.

In another embodiment, the portal is linked with the bearer management functions via a SMPP interface.

In one embodiment, the portal is linked with the pre-pay system via said SMPP interface.

In another embodiment, the portal comprises a billing application comprising means for writing billing event data to a billing log for export to an external billing system, and for dynamically interfacing with a pre-pay system for real-time debiting of subscriber accounts.

In a further embodiment, the node comprises a push server connected to the portal and to bearer management functions.

In one embodiment, the node further comprises a WTA server comprising means for invocation of mobile network services including call set-up, call forwarding, and call answering services.

In one embodiment, the UVTA server is configured as a Web Server for delivery of content requested by a client and has access to mobile network elements.

In another embodiment, the portal comprises a secure Web-based self-provisioning interface comprising means for enabling mobile network subscribers to select a portfolio of personalised services.

In one embodiment, said interface comprises means for creating a subscriber home page defining the personalised services.

In another embodiment, said interface comprises means for setting data filters, for defining push schedules, and for configuring subscriber terminal type.

In a further embodiment, the portal comprises means for allowing subscriber access to said home page via both the Internet and via a mobile network.

In one embodiment, said portal comprises a customer care provisioning interface and a provisioning database, said interface allowing network operator personnel to access said database for inputting and updating operator-specific provisioning data for subscribers.

In another embodiment, said provisioning interface comprises a mobile subscriber device provisioning function comprising means for matching content and Internet applications for device type.

In one embodiment, the portal comprises means for instantiating a generic subscriber object oriented class representing common characteristics of all subscribers, for instantiating subscriber device classes derived from the generic subscriber class, and for instantiating a management object for a subscriber.

In another embodiment, the portal comprises means for instantiating a session object for a subscriber session.

In one embodiment, the portal comprises means for linking a session object to a subscriber access rights object representing subscribed-to services.

In another embodiment, the portal comprises means for instantiating dynamic management objects for updating a subscriber's service profile, said dynamic management object interacting with session management objects to monitor subscriber usage patterns and for dynamically modifying the service profile.

In one embodiment, the portal comprises means for instantiating a payment management class for controlling subscriber payment for services.

DETAILED DESCRIPTION OF TH INVENTION

BRIEF DESCRIPTION OF THE DRAWINGS

The invention will be more clearly understood from the following description of some embodiments thereof, given by way of example only with reference to the accompanying drawings in which.

DESCRIPTION OF THE EMBODIMENTS

Figure 1:
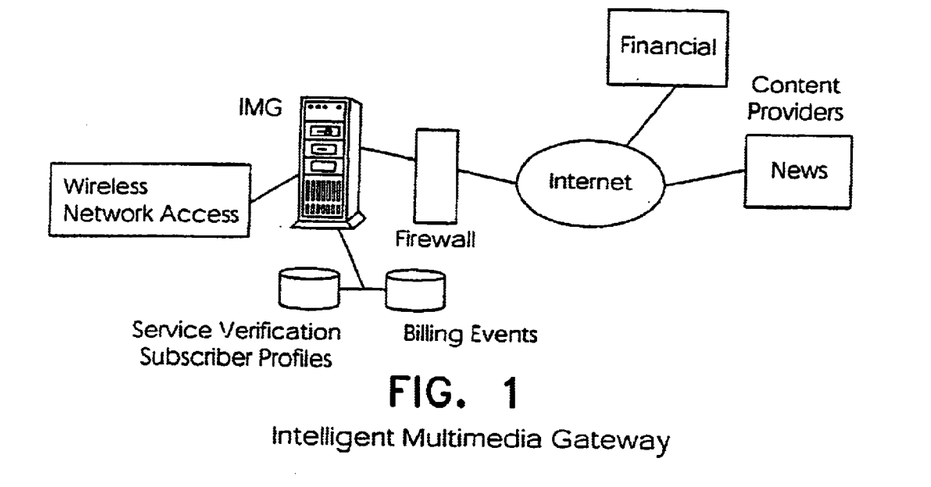
FIG. 1 is a high-level diagram illustrating the operation of an access node of the invention.

Referring to FIG. 1, an access node comprises a server and various databases. It interfaces on one side with bearers for wireless network access, and on the other side with content providers via a firewall and the Internet.

Figure 2:
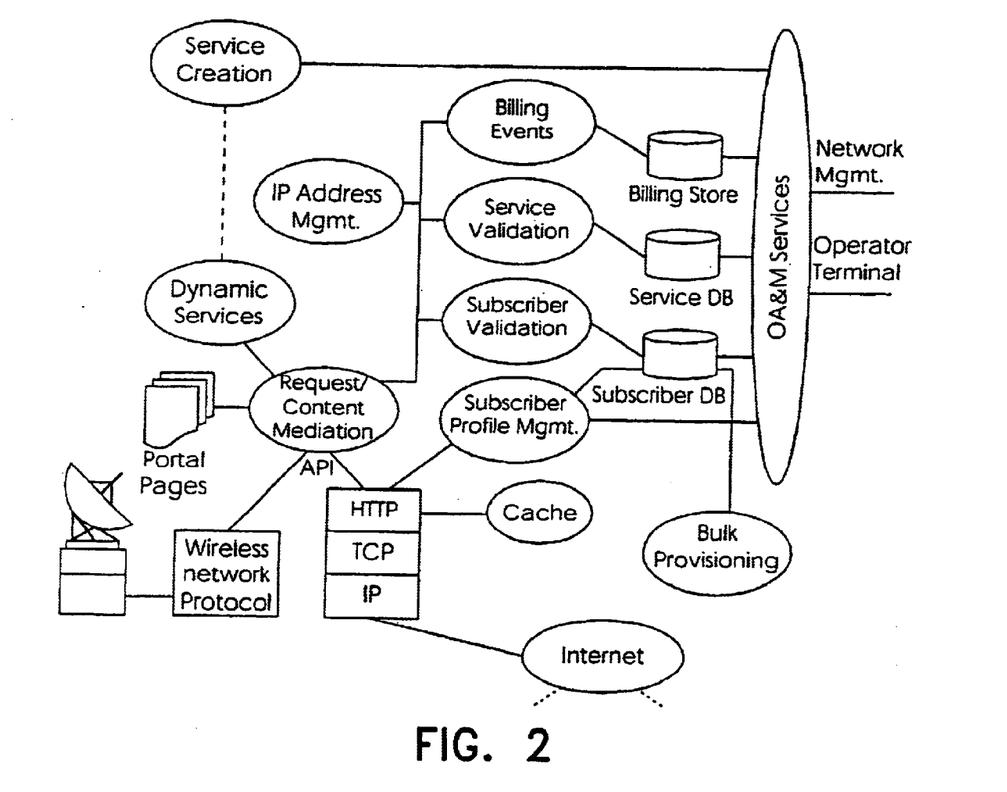
FIG. 2 is a more detailed diagram illustrating the node.

Node functions are illustrated in FIG. 2. They include functions for:
request/content/mediation,
billing events
service validation,
subscriber validation,
subscriber profile management,
maintenance (OA & M),
dynamic services, and
service creation.

For Internet-side interfacing there is a HTTP/TCP/IP stack.

Figure 3:
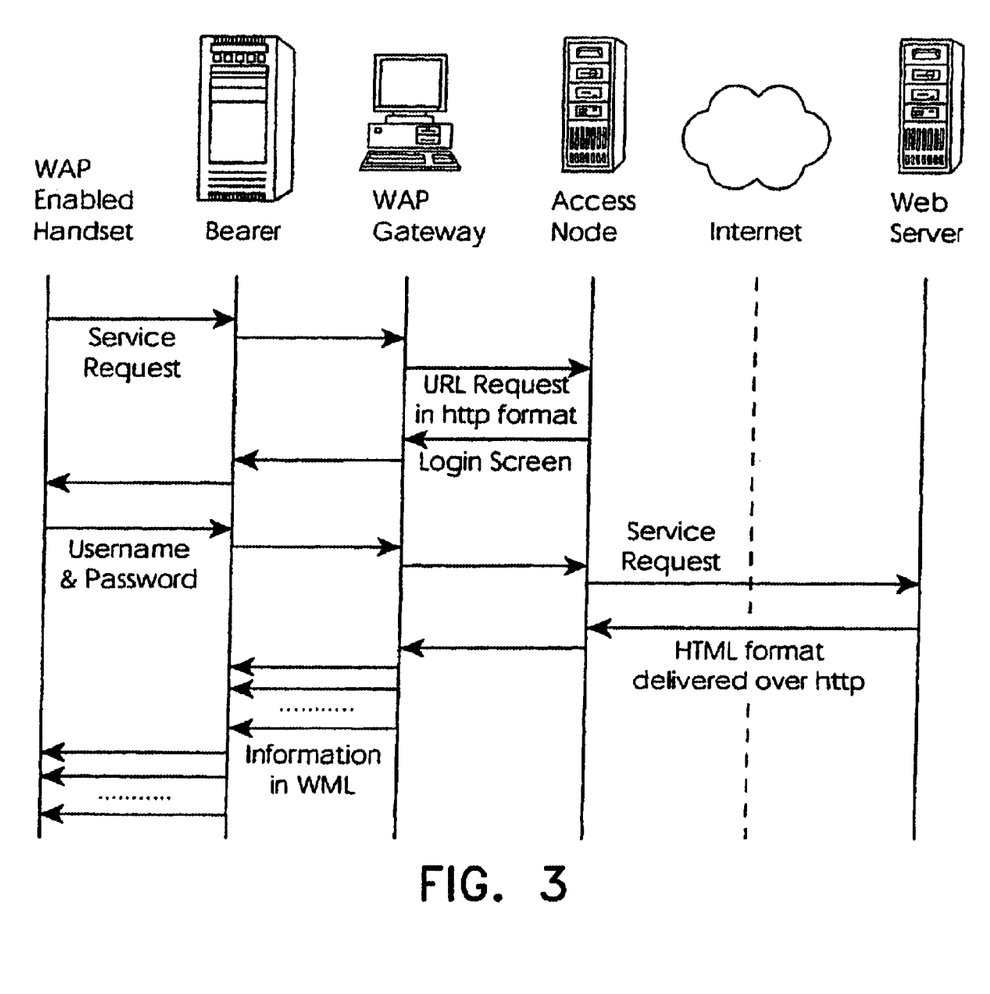
FIG. 3 is a signal diagram showing operation in one embodiment.

The node 1 also interfaces on the Internet side with a WAP gateway, and signalling sequences are illustrated in FIG. 3. A mobile user service request reaches the node as a URL request in http format, and the node presents a login screen. The user inputs access security codes and the node interfaces on the Internet side to have the required content delivered in HTML format and relayed to the user in WML format. This is a full request, but the node also handles push data transfers. Indeed an important aspect to the node is that it provides a variety of services as required by users in a versatile manner.

Figure 4:
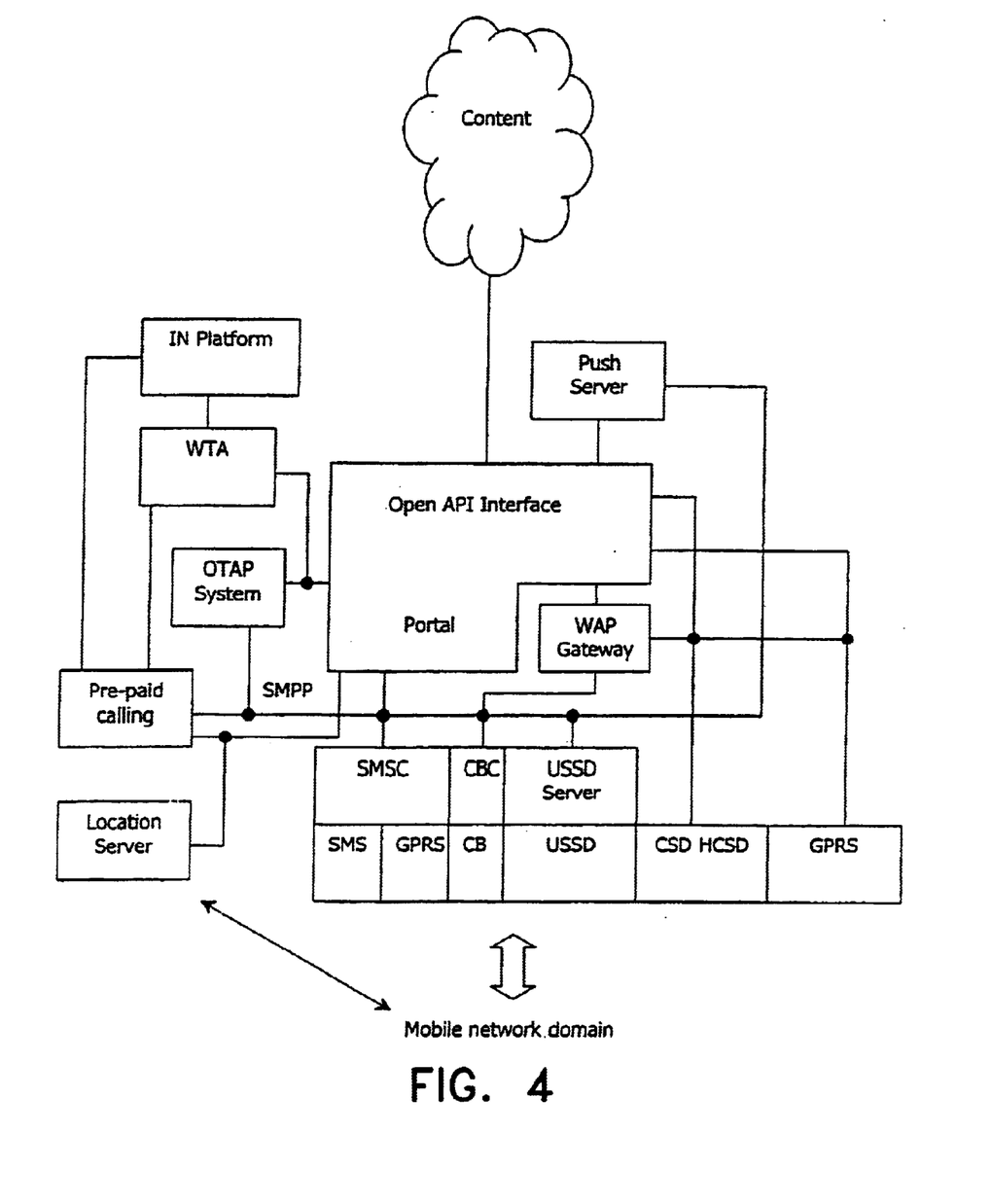
FIG. 4 is a more detailed illustration of the architecture.

The architecture of the node is shown in more detail in FIG. 4. On the wireless side, the node has stacks for SMS, GPRS, CB, USSD, CSD HSCSD, and GPRS bearers. At a higher level it includes bearer management functions including an SMSC for short message interfacing, a CBC for cell broadcast interfacing, and a USSD server for unstructured supplementary data services. A WAP gateway interfaces with the stacks. Applications reside in a portal which interfaces with the WAP gateway, an OTAP system, a pre-paid calling system, and an IN (intelligent network) platform. On the Internet/content side there is an open API providing a link for Internet content providers.

The functions of the portal are outlined in FIG. 2.

The node provides a secure management environment which enables a network operator to control the service offering, simplify the introduction of new services and manage service usage for each subscriber. It facilitates rapid deployment of new Internet applications to differentiate the service offering and to deliver the optimal value proposition to the subscriber.

Important features include:
'Personal Portal'
Service and subscriber provisioning
Subscriber authentication
Secure access to services (through 'whitelisting' and 'blacklisting')
Service management for WAP and non-WAP applications (including Email and Information services)
Bearer support and optimisation through SMPP interface (SMS, USSD, CSD, GPRS, 3G Packet-switched data network)
Content aggregation and caching
Location based service delivery based on subscriber position
Intelligent network and VPN services
Statistics and reporting
Billing and tariff generation with configurable billing
Provisioning Functions
Subscriber Self-Provisioning—'Home Page'

The portal comprises a secure web based self-provisioning interface enabling subscribers to select their own portfolio of personalised services, according to their interests, location and lifestyle. The mobile subscriber can in effect create their own personal 'home-page' in WML, which defines the services to which they have subscribed, for example regularly visited URLs, email addresses, corporate intranet store, and news services. The user can personalise and speed access to frequently used services by, for example, setting data filters, defining push schedules, configuring terminal type and preferred access bearer. A subscriber may access their 'home page' from the Internet or via the mobile station. Authentication of the subscriber is done via username and password.

Customer Care Provisioning

The portal also comprises a customer care provisioning interface to the subscriber provisioning database which is accessible by customer care personnel through a web browser based administration interface.

This is used for entry of operator specific provisioning data for individual subscribers, for example name, address, MSISDN, IMSI, IMEI, pre-paid, post-paid subscriber, service subscription information, static and dynamic IP addresses, passwords, WAP proxy server address, Dial up access numbers, and home page URL's and the services to which they subscribe. All entries are validated before being stored on the subscriber provisioning database. The node also includes an LDAP interface to enable access to an external provisioning system.

Device Provisioning

The customer care provisioning interface includes a device provisioning function which enables the operator to ensure that content is matched to the device type. This information is used to tailor the presentation of content on the handset and may also be used to select the delivery bearer. Device provisioning may be conducted by the mobile subscriber via the portal or by a customer care representative.

Service Provisioning

The node allows the service provider to create on-line descriptions of the available services, including tariffs and subscription fees where appropriate. The order in which the services appear can be optimised to ease access to the most popular services. It also includes a 'Service Bundle' provisioning capability to facilitate 'special offers' and to simplify service management, (for example, for subscriber provisioning and addition or removal of services). Security features such as 'Whitelist and Blacklist' are used to authenticate access to particular services.

Security and Authentication

Subscriber Authentication

The node acts as a Service Manager for the mobile subscriber. It controls all subscriber accesses to the network operators managed service portfolio and authenticates the Subscriber ID to verify that the subscriber is authorised to access a particular service before opening a secure connection with the appropriate application server. The Subscriber ID (typically MSISDN) and service profile are provisioned via a web based provisioning interface.

The node then manages the session between the mobile station and the designated application server and selects the optimal bearer channel for delivery of the requested information to the subscriber.

Secure Access

The node portal includes security features to minimise risk of misuse, including:

Per-subscriber usage history log file

Throttling and anti-spanning control

Controlled service access through use of white and black lists

Authorised subscriber access through white and black lists

Authorised access to specific URLs via white and black lists

Delivery Bearer Support

Support for Multiple Access Bearers via SMPP

The node supports all of the following bearers for WAP and Mobile Internet applications:

SMS (Short Message Service)

CBS (Cell Broadcast System)

USSD (Unstructured Supplementary Services Data)

CSD/HSCSD (Circuit Switched Data)

GPRS (and IS-95B and CDMA2000 Packet Data)

The merits of the various bearer options are briefly discussed below:

SMS

SMS is particularly attractive for 'push' applications in that it offers an intuitive and inexpensive bearer for push data whilst the mobile device can still be available for other services—such as voice or data calls. Additionally, unlike CSD there is no requirement to 'connect in' to access services. Therefore, there is no connection setup time associated with SMS.

CBS

Cell Broadcast is particularly suitable for advertising as a stimulant to promote usage of other network services. It is also ideal for broadcast of network related information to subscribers on the network for example, menus of available services and Service Provider Home page. Used in this way, it can be a very effective means of attracting roaming subscribers onto the network.

USSD

USSD enables delivery of interactive services offering a 'WAP like' look and feel with much faster response time than are achievable with current Circuit Switched Data services. Examples of services currently offered over USSD by the node include news sports results, and stock quotes and purchases.

Circuit Switched Data (CSD)

There are some drawbacks associated with using CSD for WAP access. For example, CSD may be more expensive to use than other bearers, connection time may be significant and the mobile station will be unavailable for voice calls when using the CSD bearer to access the WAP service. However, once connected, CSD offers a reasonably fast response and is well suited for interactive services and for data intensive WAP services, such as Email download, since it offers greater bandwidth than SMS. The node supports dial up data connections over CSD (currently at 9.6 Kbps) via a Remote Access Server (RAS).

General Packet Radio Service (GPRS)

GPRS is a packet based service and is ideal for delivery of 'bursty' data traffic to the mobile. It offers IP connectivity and provides a high speed, reliable and efficient bearer for delivery of packet data services to the mobile device. Since GPRS is IP based, it also offers an 'always on line' capability which will remove the need to connect in to access services, as is the case with CSD.

The node has an IP based interface to a GPRS network via the Gateway GPRS Support Node (GGSN). In addition, the SMSC provides full SMS messaging capability over a GPRS network through its interface to the serving GPRS Support Node (SGSN). Thus, if the subscriber is 'GPRS attached' he or she can take advantage of the increased bandwidth of the GPRS network for higher performance SMS delivery. If the GPRS delivery attempt is unsuccessful, the SMSC provides secondary SMS delivery capability via the MSC. The dual delivery path options provided by the SMSC provide more efficient resource usage in a GPRS network and offer an increased likelihood of successful delivery.

Service Management for Non-WAP Applications

The node also provides a service management capability for non-WAP services via the SMPP interface to the bearer management functions including the SMSC, the CBC and the GSM USSD Server, shown in FIG. 4. Thus, the Network Operator may also use the node to offer Mobile Internet applications and services to the vast majority of subscribers who do not currently have WAP-enabled terminals. Since the node offers a common service management and delivery framework, users will experience no change or disruption to services as they migrate to WAP enabled terminals.

Dynamic Bearer Management

The node provides intelligent bearer management across message centre applications. Bearer preferences may be configured by the subscriber and or by the Customer Care representative based on the type of application, terminal type tariff and user preference. This feature can be used to optimise use of network infrastructure and ensure a positive user experience.

Pre-Paid System and OTA Support
Pre-Paid System Interface

The node includes with a Pre-paid IN system shown in FIG. 4 to query the Pre-paid subscriber's credit level on receipt of a WAP service request. If the subscriber has sufficient credit, the service request will be processed, but if not, the subscriber will be offered a credit top-up option in order to proceed. Therefore, the node enables WAP and Mobile Internet services to be delivered to pre-paid subscribers and post-paid subscribers.

Over the Air Programming

The node also provides an SMPP interface to OTAP products to enable over-the-air programming of the mobile station. This enables the operator to provide an intuitive menu driven method to subscribers for download of software updates and/or information on new services or software versions.

Interfaces
Industry Standard WAP Gateway Interface

The node includes a WAP Gateway linked with the portal by an HTTP interface and is compliant with the WAP v1.2 specification, as defined by the WAP Forum. All WAP compliant gateways are supported. Thus, the node interworks with the Service Provider's existing WAP Gateway if present on the network.

Open API

The portal also comprises a simple API which provides application developers with the key parameters required to develop enhanced Mobile Internet services, for example, location based applications. The node can retrieve subscriber location information from either a GPS or IN based Location Server in the Mobile Network and present it to an application via the open API, thus enabling location based service and content to be delivered to the mobile user, for example nearest ATM, petrol station, train station or local restaurants, hotels, taxi companies etc.

Intelligent Billing

The node provides intelligent billing capability which enables the Service Provider to manage tariffs and service charges for each service and mobile subscriber. The following are the billing options:

Time or connection based (charge per second/minute connected to service)

Event based (charge per service access or request)

Transaction based (e.g. charge per transaction or purchase)

Subscription based (e.g. monthly charge for access to service)

Data volume (e.g. charge by size of data downloaded)

The node portal exports billing data to an external billing system (not shown). Billing event information is archived in a billing log for bulk export and subsequent post-processing. It also comprises a real time billing interface to the pre-paid calling system, enabling real-time debiting of pre-pay subscriber accounts which enables the Network Operator to also offer mobile internet services to Pre-Paid subscribers, whilst minimising potential for fraud.

Statistics and Reporting

The node generates reporting and statistical outputs which allow the Network Operator to collect information on subscriber history and service usage. This information can be used to refine the service offerings, for selective marketing and loyalty programs and also for billing purposes.

System Management and Performance
Aggregated Content and Service Data Caching

The node aggregates data from most popular applications and content sources. It also includes a configurable caching function for each individual subscriber and retains frequently accessed data on platform.

SNMP Support

The OA&M module shown in FIG. 2 allows system management and administration for alarm collection, event monitoring, performance management, and usage Statistics and report generation. An SNMP alarm agent configures event and alarm traps, which can be exported for use by a network management system.

Virtual Private Network (VPN) Access

The node facilitates access to VPN services for corporate customers offering advantages such as:

| | |
|---|---|
| Central Billing | enabling a company providing a VPN to receive one bill for all of their employees. |
| Security | Appropriate usage restrictions can be defined to prevent misuse of the service such as<br>   Employee usage limit<br>   Company usage limit etc. |
| Guaranteed Service | The node allows the Operator to offer guaranteed access for VPN clients at any time, if necessary restricting bandwidth capacity for public subscribers at peak times to ensure guaranteed access for corporate VPN clients. |

A VPN service can be used by the Operator.

Portal Architecture

The portal (shown in FIG. 4) is a high performance, multi-threaded service management system. It is designed in a modular architecture which offers upward scalability as subscriber numbers grow. The following are the main aspects of technical operation of the portal.

1. Subscriber Management

Subscriber management is a core function of the portal product as it provides the basis for many of the added value services provided by the portal.

A generic subscriber class is defined within the portal that represents common characteristics of all subscribers, for example identifier, class of service, and other such attributes. From the generic subscriber class are derived many subscriber sub-classes that allow the portal to manage subscriber profiles across a wide range of different technologies. For example, if a subscriber uses SMS as their primary access technology, management of that subscriber is based on an SMS sub-class, derived from the generic subscriber class, and allows the portal to ensure that the personalised service is automatically offered to the subscriber over their preferred SMS access technology. For each subscriber created on the portal, a specific instance of the appropriate class or sub-class is created and becomes the management object for that subscriber.

It is possible for a single subscriber to be represented by multiple sub-classes, for example this allows subscribers to define different profiles for different devices that they may use to access their Mobile Internet service, such as their mobile handset or a more powerful PDA.

The subscriber classes and sub-classes are designed to allow the capture of dynamic profile information about subscribers based on observed usage of Mobile Internet services. With this capability the portal can provide advanced levels of customised service based on its ability to "learn" the preferences of the subscriber.

2. Session Management

The subscriber classes and sub-classes provide the means to manage permanent or semi-permanent data associated with individual subscribers. A different hierarchy of classes and sub-classes is created to allow the portal to manage the dynamic or temporary data associated with a subscriber's use of the portal—this is called session management.

In a similar fashion to subscriber management, a generic session class is defined within the portal. From this generic session class are derived session sub-classes representing the different types of session that may be created on the portal. For example, an SMS session object would be created for a subscriber using SMS as the access technology, or a WAP session object would be created for a subscriber using WAP as the access technology.

3. Access Control

Verification of subscriber access rights is an intrinsic part of the session management functions provided by the portal. When a subscriber profile object is created, a link is established to a Subscriber Access Rights object created for each subscriber. The purpose of this object is to provide an efficient internal representation of the services the subscriber has selected, for example the subscriber may have agreed to pay premium fees for access to certain premium services offered by the operator.

The access control function can operate in a number of different ways depending on the type of service under management by the portal.

For a "pull" type service, where the subscriber submits a request to a mobile internet service, the portal's session management function ensures that a verification request is sent to the Subscriber Access Rights object to ensure that the subscriber is authorised to access the specified service. If the verification request is confirmed, the request is allowed to continue to the specified service. If the verification request is denied, the portal can provide a range of recovery actions, including offering the subscriber an opportunity to register or subscribe to the specified service. This is an example of one of the dynamic subscriber profiling mechanisms implemented within the portal.

For a "push" type service, where a service is authorised to send unsolicited content or information to a mobile subscriber, the portal's session management software ensures that a verification request is sent to the Subscriber Access Rights object for all push content prior to delivery. If the verification request is confirmed, the portal authorises delivery of the push content to the subscriber. If the verification request is denied, a number of recovery actions may be undertaken by the portal, including an opportunity for the subscriber to manually accept or reject the proposed push content.

4. Personalisation

The service personalisation capability of the portal is based on a combination of the subscriber, session and access objects described above. These objects are supplemented by a range of management objects, both static and dynamic. Static management objects are instantiated to allow subscriber personalisation to be performed through direct interaction with the subscriber. For example, a subscription management object is created to allow a subscriber to register or subscribe for premium rate services offered by the portal operator. A Class-of-Service management object ensures that when a specific class-of-service is assigned to a subscriber, any service rights associated with that class-of-service are automatically added to the Subscriber Access Rights object.

Dynamic management objects are instantiated to ensure that a subscriber's service profile can be updated without direct interaction from the subscriber. Dynamic management objects co-operate with session management objects to monitor the pattern of usage of mobile internet services by the subscriber. With this technique, the dynamic management objects are able to suggest that frequently visited services that may not already be on the subscriber's personal list are automatically added.

Another dynamic management object would be able to alert the subscriber to new services that match the subscriber's observed interests.

5. Post-Paid and Pre-Paid Charging

An important element of the service management capability offered by the portal is the ability to tailor the charging/billing information according to the preferred method of payment of the individual subscriber.

Again this capability is based on a combination of the subscriber profile object and the session management object, supplemented by an appropriate Payment Management object.

A Payment Management class is defined from which are derived two sub-classes: Post-Paid and Pre-Paid. When the subscriber profile object is created, the information in the subscriber profile is used to select the appropriate payment management sub-class for the subscriber, and a new Payment Management object is created for the subscriber. Further sub-classes may be developed so as to provide payment management objects with specific characteristics for generating billing information in specific formats, or communicating with specific pre-paid systems.

When the subscriber starts a new session on the portal, the session management object establishes a link to the subscriber's Payment Management object. As each service action is invoked, a request is sent to the subscriber's Payment Management object.

For a post-paid subscriber, the response to the request is always positive, the requested action is allowed and a corresponding billing item is generated for inclusion on the subscriber's bill.

For a pre-paid subscriber, the response to the request depends on the level of credit remaining in the subscriber's pre-paid account (which may be held on an external system). If sufficient credit is available to allow the operation to proceed, a positive response is provided by the payment object. If there is insufficient credit to allow the operation to proceed, a number of recovery actions are possible, including the ability to allow the subscriber to invoke a credit re-charge operation within the current session.

WAP Gateway

The WAP gateway is a complete WAP v1.1. compliant WAP gateway and enables WAP capable mobile stations to access applications and services which may be hosted either within the Network Operator's own domain or in another location. The gateway has a WAP stack with WSP, WTP, WTSL, WDP, bearer interface, and UDP/SMS layers. It also has a WAP proxy stack with encoder HTTP client, and cache layers.

The node may include the WAP gateway as an integrated component, or it may be linked with a network operator's existing WAP gateway. The architecture as illustrated in FIG. 4 allows this flexibility.

Push Server

WAP Push provides a means to 'push' content to a mobile device via the WAP architecture, without requiring an explicit user initiated request.

The Push server provides a gateway function between Internet based Web servers and the mobile network, thus allowing content to be pushed to a WAP compliant terminal. The Push server supports the WAP v1.2 Push related protocols as defined by the WAP Forum. It accepts pushed content from the Internet via the WAP Push Access Protocol (PAP) over HTTP, which allows the internet server to:

Submit content to be pushed to mobile device;

Cancel a push request;

Query the status of a push request;

Query capabilities of the wireless device

The Push server also supports PAP result notification. It will acknowledge successful (or report unsuccessful) transmission and delivery of the information to be pushed and can return a status to the internet server indicating whether the message was successfully delivered, was cancelled or expired before delivery could be completed. Handling and processing errors are also returned.

Once the content is accepted for delivery, the Push server attempts to deliver the content to a WAP compliant destination client using the WAP Push Over-The-Air protocol (OTA). Encoding of both WML and Service Indication content types is supported. Other application specific content types are delivered as received. The Push Server includes a Short Message Peer to Peer (SMPP) protocol interface to a Short Message Service Centre and thus supports all common network technologies, including GSM, CDMA, ANSI-136 and PDC. It is integrated with the SMSC and the CBC service management functions.

WTA Server

Figure 5:
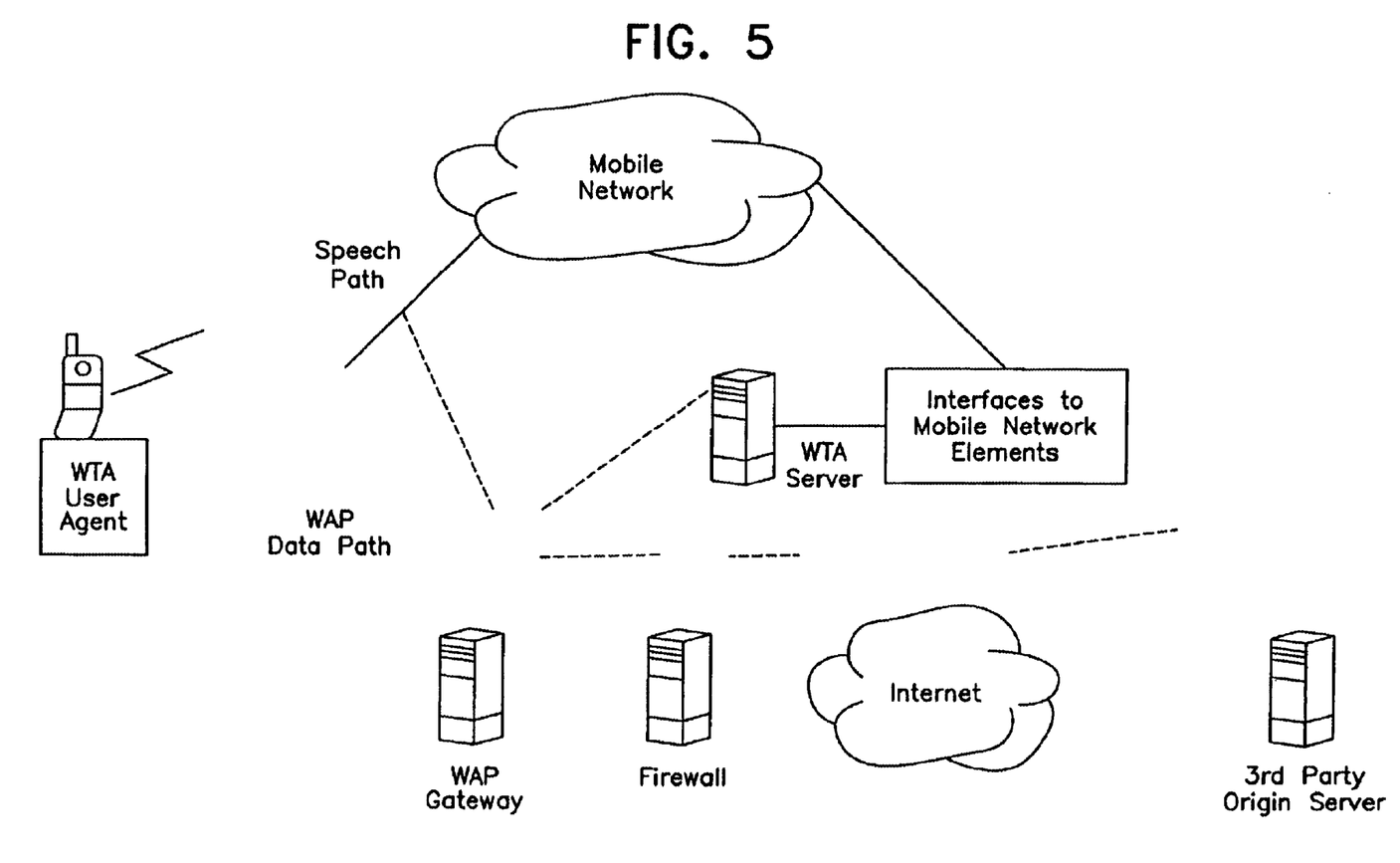
FIG. 5 is a diagram showing operation of a WTA server.

The WAP WTA server shown in FIG. 4 enables access to network elements (for example PrePay recharge) and provide services requiring invocation of mobile network services, for example call set-up, call forwarding, call answering, call conferencing, and send text. The WTA architecture is illustrated in FIG. 5.

The WTA server resides within the domain of the mobile network operator and may be connected to various network elements in the mobile network, for example the HLR, voice mail system, or customer care system. A WAP-enabled handset contains a WTA User Agent which is connected to the mobile network using dedicated signalling protocols. The WTA server (an origin server) communicates with the client using the WAP protocol stack (via the WAP gateway). In the case of a call handling service, the mobile network sets up the call to the client. The WTA server delivers the event-handling content to the WTA User Agent. The user agent invokes the event-handler content and manages the presentation of the call handling service to the user.

The WTA User Agent is a content interpreter that extends a typical WML User Agent. It supports extended libraries which give it an interface to mobile network services available to a mobile telephony device, e.g. setting up and receiving phone calls (Wireless Telephony Applications Interface—WTAI).

The WTA server is a web server delivering content requested by a client. The WTA user agent uses URLs to reference content on the WTA server. A URL may be used to reference an application (e.g. a CGI script or a Java servlet) that is executed when the URL is referenced. This mechanism is used to create services that use URLs to interact with the mobile network (e.g. an IN node, voice mail system, etc.). These services can then be invoked from the WTA user agent simply by referencing the appropriate URLs. The WTA server is under the control of the network operator and is therefore regarded as a "trusted" content server. The server may control or have access to network elements in the mobile network, for example, it could have a signalling connection to the network switch or HLR. The network operator is able to control the latency of requests for content to the WTA server as it resides within the operator's domain and is not subject to the delays that are characteristic of requests that go via the Internet. This is an important consideration as latency can have a significant impact on the success or failure of telephony services.

Initiating WTA Services

WTA services may be mobile-originated (for example check voicemail) or network-initiated (for example voicemail alert). To initiate a WTA service from the mobile handset, the WTA user agent simply accesses the appropriate URL corresponding to the desired service. The URL may be accessed in the local repository (for frequently used WTA services) or on the WTA server via the WAP gateway. Network-initiated services may be invoked in two ways:

A network event received by the handset (e.g. incoming call) is transformed into a WTA event in the user agent.

The WTA server may send a Service Indication representing a network event to the WTA user agent.

It will be appreciated that the access node of the invention essentially provides a service management framework to allow network operators to use the various and disparate services available on the Internet to provide valuable services to mobile subscribers. These services are provided in a manner which allows simple, easy-to-use, and personalised user interaction. The modular structure of the node also allows simple accommodation of developments in bearer-side and Internet-side technologies.

The invention is not limited to the embodiments described but may be varied in construction and detail.

What is claimed is:

1. A service management access node comprising a mobile network interface, an Internet interface, and a service conversion and message relaying platform between said interfaces for provision of Internet content to mobile subscribers, the platform comprises means for controlling mobile subscriber access according to security criteria, for allowing a mobile subscriber to create a personalised content profile, and for storing said profile and managing transmission of requests and delivery of content according to said profile, and the mobile network interface comprises a bearer stack for each of a plurality of different bearers, the platform comprising a pre-pay system including means for allowing access by mobile subscribers to content on a pre-paid basis, the pre-pay system being module linked with the portal.

2. A service management access node as claimed in claim 1, wherein the node comprises a push server connected to the portal and to bearer management functions.

3. A service management access node as claimed in claim 1, wherein the node further comprises a WTA server comprising means for invocation of mobile network services including call set-up, call forwarding, and call answering services.

4. A service management access node as claimed in claim 3, wherein the WTA server is configured as a Web Server for delivery of content requested by a client and has access to mobile network elements.

5. A service management access node comprising a mobile network interface, an Internet interface, and a service conversion and message relaying platform between said interfaces for provision of Internet content to mobile subscribers, the platform comprises means for controlling mobile subscriber access according to security criteria, for allowing a mobile subscriber to create a personalised content profile, and for storing said profile and managing transmission of requests and delivery of content according to said profile, and the mobile network interface comprises a bearer stack for each of a plurality of different bearers, the platform comprising a portal including means for interfacing with the bearer stacks and with a WAP gateway, and wherein the portal includes the Internet interface, the portal being connected to the bearer stacks via bearer management functions, the bearer management functions including an SMSC.

6. A service management access node comprising a mobile network interface, an Internet interface, and a service conversion and message relaying platform between said interfaces for provision of Internet content to mobile subscribers, the platform comprises means for controlling mobile subscriber access according to security criteria, for allowing a mobile subscriber to create a personalised content profile, and for storing said profile and managing transmission of requests and delivery of content according to said profile, and the mobile network interface comprises a bearer stack for each of a plurality of different bearers, the platform comprising a portal including means for interfacing with the bearer stacks and with a WAP gateway, and wherein the portal includes the Internet interface, the portal being connected to the bearer stacks via bearer management functions, the bearer management functions including a USSD server.

7. A service management access node comprising a mobile network interface, an Internet interface, and a service conversion and message relaying platform between said interfaces for provision of Internet content to mobile subscribers, the platform comprises means for controlling mobile subscriber access according to security criteria, for allowing a mobile subscriber to create a personalised content profile, and for storing said profile and managing transmission of requests and delivery of content according to said profile, and the mobile network interface comprises a bearer stack for each of a plurality of different bearers, the platform comprising a portal including means for interfacing with the bearer stacks and with a WAP gateway, and wherein the portal includes the Internet interface, the portal being connected to the bearer stacks via bearer management functions, the portal being linked with the bearer management functions via a SMPP interface.

8. A service management access node comprising a mobile network interface, an Internet interface, and a service conversion and message relaying platform between said interfaces for provision of Internet content to mobile subscribers, the platform comprises means for controlling mobile subscriber access according to security criteria, for allowing a mobile subscriber to create a personalised content profile, and for storing said profile and managing transmission of requests and delivery of content according to said profile, and the mobile network interface comprises a bearer stack for each of a plurality of different bearers, the platform comprising a pre-pay system including means for allowing access by mobile subscribers to content on a pre-paid basis, the portal being linked with the pre-pay system via a SMPP interface.

9. A service management access node comprising a mobile network interface, an Internet interface, and a service conversion and message relaying platform between said interfaces for provision of Internet content to mobile subscribers, the platform comprises means for controlling mobile subscriber access according to security criteria, for allowing a mobile subscriber to create a personalised content profile, and for storing said profile and managing transmission of requests and delivery of content according to said profile, and the mobile network interface comprises a bearer stack for each of a plurality of different bearers, the platform comprising a portal including means for interfacing with the bearer stacks and with a WAP gateway, and wherein the portal includes the Internet interface, the portal including a billing application having means for writing billing event data to a billing log for export to an external billing system, and for dynamically interfacing with a pre-pay system for real-time debiting of subscriber accounts.

10. A service management access node comprising a mobile network interface, an Internet interface, and a service conversion and message relaying platform between said interfaces for provision of Internet content to mobile subscribers, the platform comprises means for controlling mobile subscriber access according to security criteria, for allowing a mobile subscriber to create a personalised content profile, and for storing said profile and managing transmission of requests and delivery of content according to said profile, and the mobile network interface comprises a bearer stack for each of a plurality of different bearers, the platform comprising a portal including means for interfacing with the bearer stacks and with a WAP gateway, and wherein the portal comprises the Internet interface, the portal including a secure Web-based self-provisioning interface having means for enabling mobile network subscribers to select a portfolio of personalised services, said interface having mean for creating a subscriber home page defining the personalised services, said interface having means for setting data filters, for defining push schedules, and for configuring subscriber terminal type.

11. A service management access node comprising a mobile network interface, an Internet interface, and a service conversion and message relaying platform between said interfaces for provision of Internet content to mobile subscribers, the platform comprises means for controlling mobile subscriber access according to security criteria, for allowing a mobile subscriber to create a personalised content profile, and for storing said profile and managing transmission of requests and delivery of content according to said profile, and the mobile network interface comprises a bearer stack for each of a plurality of different bearers, the platform comprising a portal including means for interfacing with the bearer stacks and with a WAP gateway, and wherein the portal comprises the Internet interface, the portal including a secure Web-based self-provisioning interface having means for enabling mobile network subscribers to select a portfolio of personalised services, said interface having mean for creating a subscriber home page defining the personalised services, the portal having means for allowing subscriber access to said home page via both the Internet and via a mobile network.

12. A service management access node comprising a mobile network interface, an Internet interface, and a service conversion and message relaying platform between said interfaces for provision of Internet content to mobile subscribers, the platform comprises means for controlling mobile subscriber access according to security criteria, for allowing a mobile subscriber to create a personalised content profile, and for storing said profile and managing transmission of requests and delivery of content according to said profile, and the mobile network interface comprises a bearer stack for each of a plurality of different bearers, the platform comprising a portal including means for interfacing with the bearer stacks and with a WAP gateway, and wherein the portal comprises the Internet interface, said portal having a customer care provisioning interface and a provisioning database, said interface allowing network operator personnel to access said database for inputting and updating operator-specific provisioning data for subscribers.

13. A service management access node as claimed in claim 12, wherein said provisioning interface comprises a mobile subscriber device provisioning function comprising means for matching content and Internet applications for device type.

14. A service management access node as claimed in claim 12, wherein the portal comprises means for instantiating a generic subscriber object oriented class representing common characteristics of all subscribers, for instantiating subscriber device classes derived from the generic subscriber class, and for instantiating a management object for a subscriber.

15. A service management access node as claimed in claim 14, wherein the portal comprises means for instantiating dynamic management objects for updating a subscriber's service profile, said dynamic management object interacting with session management objects to monitor subscriber usage patterns and for dynamically modifying the service profile.

16. A service management access node as claimed in claim 14, wherein the portal comprises means for instantiating a payment management class for controlling subscriber payment for services.

17. A service management access node as claimed in claim 14, wherein the portal comprises means for instantiating a session object for a subscriber session.

18. A service management access node as claimed in claim 17, wherein the portal comprises means for linking a session object to a subscriber access rights object representing subscribed-to services.

* * * * *